Feb. 19, 1963 H. LEBER 3,078,170
METHOD FOR MAKING CHEESE
Filed Oct. 23, 1958 3 Sheets-Sheet 1

INVENTOR.
HENRY LEBER
BY
ATTORNEYS

Feb. 19, 1963 H. LEBER 3,078,170
METHOD FOR MAKING CHEESE
Filed Oct. 23, 1958 3 Sheets-Sheet 2

INVENTOR.
HENRY LEBER
BY
ATTORNEYS

Feb. 19, 1963 H. LEBER 3,078,170
METHOD FOR MAKING CHEESE
Filed Oct. 23, 1958 3 Sheets-Sheet 3
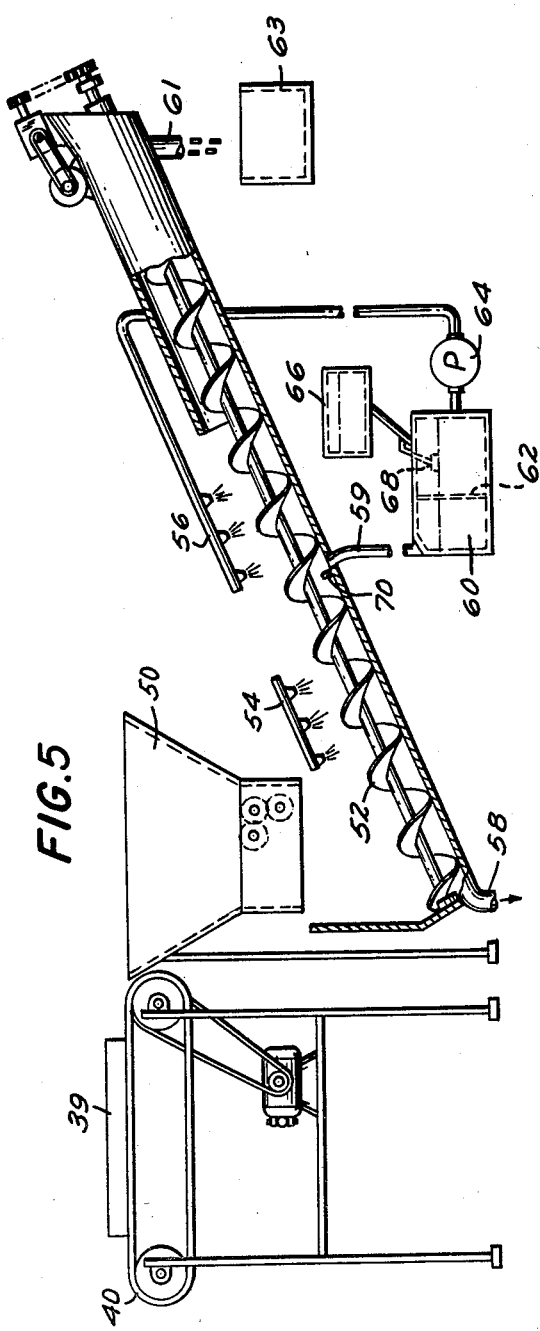
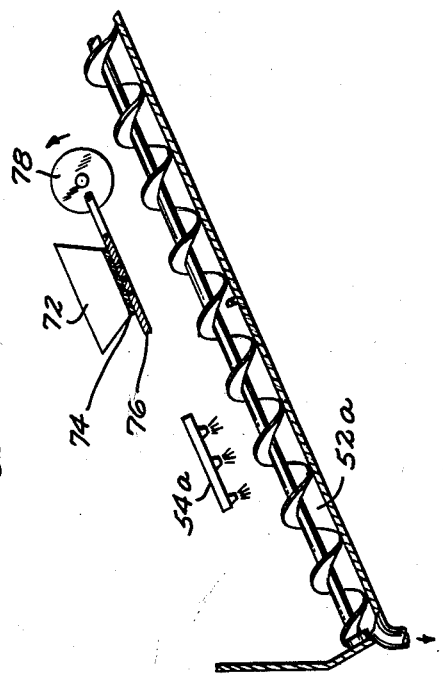
INVENTOR.
HENRY LEBER
BY
ATTORNEYS United States Patent Office 3,078,170
Patented Feb. 19, 1963

3,078,170
METHOD FOR MAKING CHEESE
Henry Leber, Syracuse, N.Y., assignor to Ched-O-Matic Corporation, Heuvelton, N.Y., a corporation of New York
Filed Oct. 23, 1958, Ser. No. 771,699
11 Claims. (Cl. 99—116)

This invention relates to a novel method and apparatus for making cheese, particularly the type of hard cheese popularly known as Cheddar cheese.

Conventional methods of making a Cheddar type cheese include the steps of adding starter and rennet to milk in a large vat having a capacity of say 10,000 to 15,000 pounds; maintaining the milk at a temperature of about 85° F. for about a half hour, during which time the milk coagulates or sets to form a jelly-like mass; manually cutting this mass into cubes, referred to in the trade as "curds," with vertical and horizontal wire cutters, heating and agitating the curd and the whey, which exudes from the curd kernels, to a temperature of approximately 100° F. or slightly higher; draining off part of the whey; cutting the remaining curd into blocks; manually turning the blocks over in the vat and eventually piling them on top of one another while maintaining them at approximately 100° F.; milling the blocks into smaller blocks; stirring the milled blocks to provide for further drainage of the whey; salting the drained blocks and finally pressing them into forming hoops.

It will readily be appreciated that the results obtained are dependent in large part upon the judgment and experience of the attendants and further that the process is inherently unsanitary. Thus, for example, the turning of the blocks of curd in the vat, an operation known in the trade as cheddaring, requires two attendants leaning over the vat to manaully pick up and turn over the curd blocks one at a time while temperatures in the vat are maintained in the vicinity of 100° F. It is the purpose of this treatment to promote full development of acid in the curd, partial expulsion of the whey and removal of any voids. The extent to which these objectives are attained depends upon the skill, judgment and even the disposition of the attendants who, in the last analysis, determine the frequency of turning and the duration of the cheddaring treatment. It is also manifest, for example, that the salting, carried out by sprinkling salt on the milled curd lying on the bottom of the vat, is not only unsanitary but haphazard by virtue of unevenness of distribution and of absorption by the curd.

It is the principal object of this invention to provide a method and apparatus for making cheese that avoids unsanitary conditions such as these and makes the final quality of the product less dependent upon the skill or whim of the operator. It is a further object of this invention to provide for almost complete automation in the making of cheese.

In accordance with the preferred embodiment of the invention, the operations that are most vulnerable to unsanitary conditions and most likely to result in nonuniformity of the product are performed in an entirely different and novel manner. Thus, in one phase of the method of the invention, the tedious and inherently unsanitary curd block turning process is replaced by a residual whey removal and curd fusion operation in a compression chamber that minimizes loss of heat and contact of the curd with the atmosphere and substantially provides automatic control over fusion of the curd during acid development. In another phase of the invention all of the operations on curd substantially fully drained of the free whey are made continuous and substantially automatic, the curd being continuously and automatically shredded, washed and uniformly salted prior to hooping.

The apparatus of the invention generally comprises a porous drum for removal of most of the free whey from a suspension of curds and whey, a compression chamber for fusion of the curd, a shredder for shredding the blocks of curd received from the compression chamber and means for washing and salting the shredded curd prior to hooping.

The utility and advantages of the method and apparatus of the invention will be described in more detail with reference to the accompanying drawing illustrating the best mode now contemplated for practicing the invention.

In the drawing:

FIGURE 5 is a schematic view showing a preferred embodiment of the apparatus for continuously processing slabs of curd delivered by the press; and FIGURE 6 is a schematic view of another embodiment of apparatus for washing and salting shredded curd delivered from the shredder.

Figure 1:
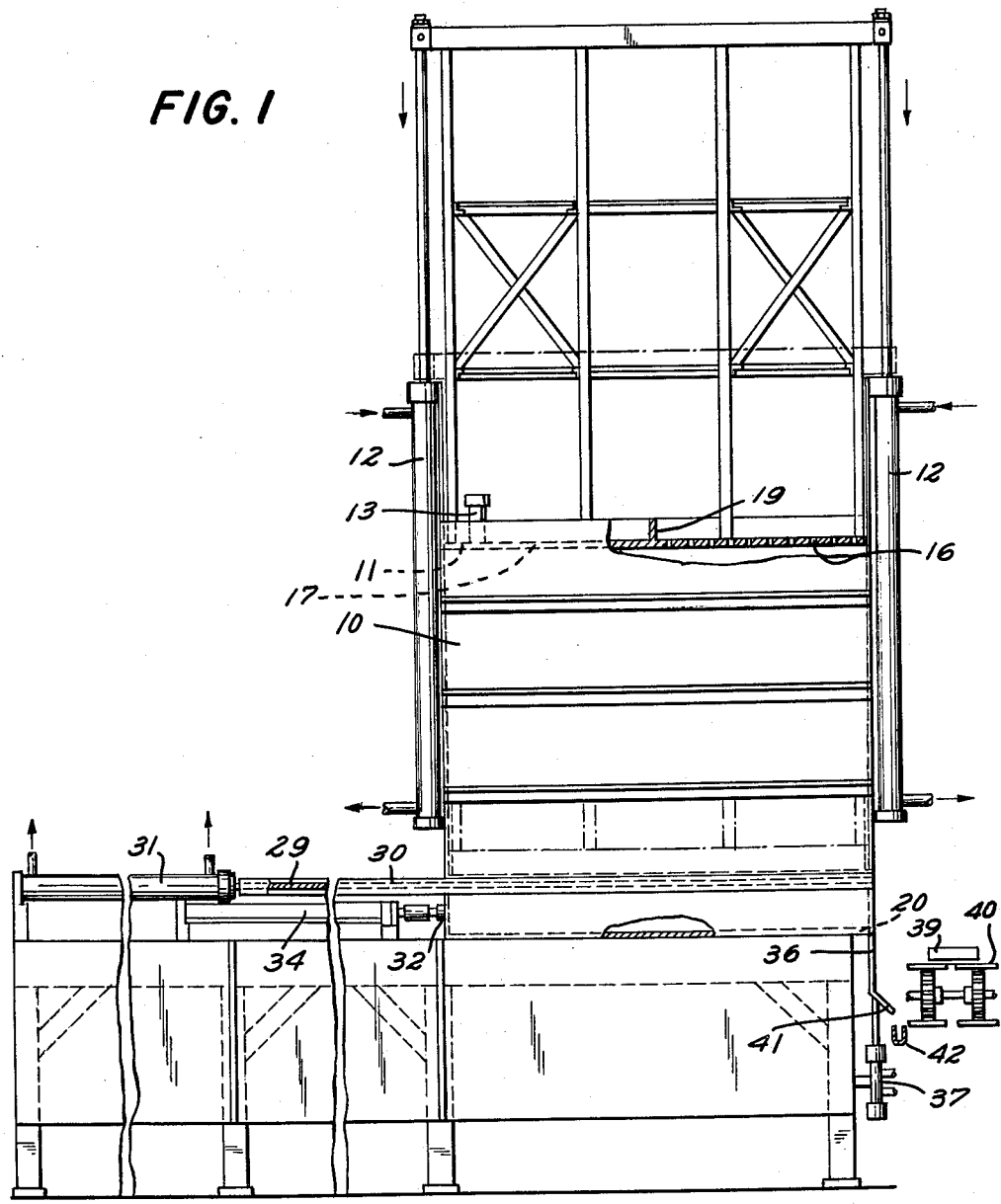
FIGURE 1 is a view in elevation of a compression chamber including a device for cutting a curd block into mill blocks.
Figure 2:
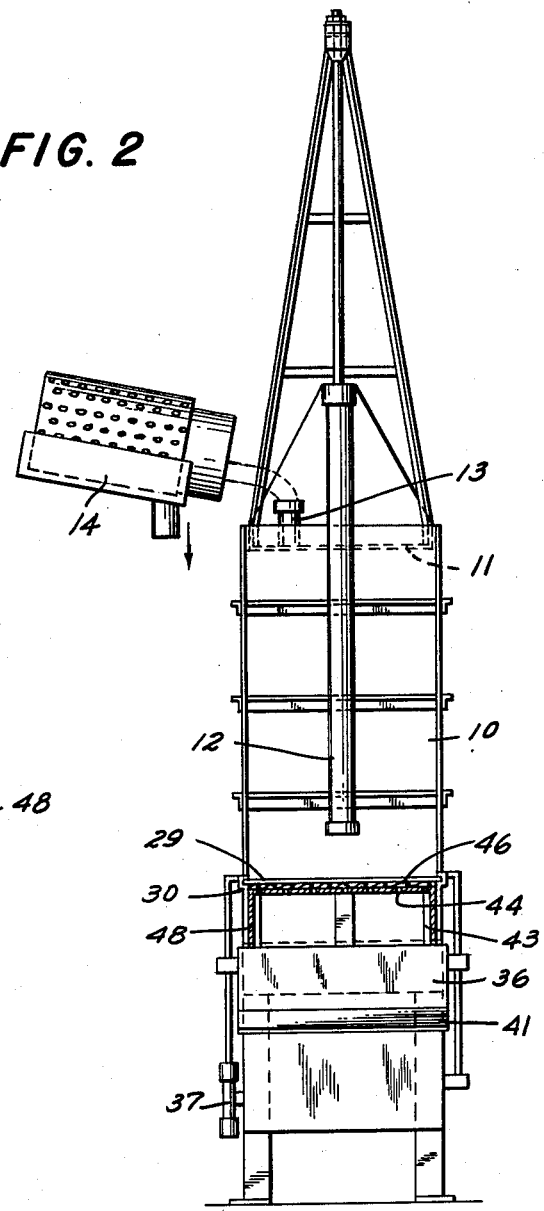
FIGURE 2 is an end view in elevation of the apparatus shown in FIGURE 1, including a revolving porous drum for preliminary draining most of the free whey from the curd and a removable porous bottom for the chamber.

Referring now to FIGURES 1 and 2, the compression chamber in which the drained curd is fused comprises a rectangular vessel 10 provided with a vertically movable platen 11 whose movement within the vessel 10 is controlled by hydraulic cylinders 12. The platen 11 is provided with a suitable filling pipe 13 for receiving the drained curd from suitable means such as a rotatable porous drum 14 for preliminarily removing most of the free whey by tumbling the suspension of curds in whey. In the embodiment illustrated, part of the area of the platen 11 is perforated as shown at 16. The other, non-perforated area 17 of the platen, is separated from the perforated area 16 by a screen 19.

The bottom of the vessel 10, as shown for purposes of illustration, comprises a removable porous bottom 43 comprising porous screen 44 having cheesecloth 46 thereon and a fixed non-porous plate 20.

The lower portion of the vessel 10 is provided with a parting knife and partition 29 movable horizontally in a slide or track 30 and actuated by a hydraulic cylinder 31 or equivalent means. Immediately below the parting knife 29 and in a cut-out portion of the side wall there is provided an extrusion piston 32 flush with the side wall and actuated by the hydraulic cylinder 34 or equivalent means. At the opposite side in the lower portion of the vessel 10 there is a vertical cut-off knife 36 actuated upwards by hydraulic cylinder 37 for cutting a block of fused curd into a slab 39, shown in FIG. 1 as resting on a conveyor 40. The lower portion of knife 36 has an outward flange 41 on which the residual free whey drains from the compression chamber. During the fusing operation the residual free whey drains through the cheesecloth 46 and porous screen 44 which together comprise removable porous bottom 43, and falls onto the bottom 20 of the vessel 10 and then flows outward onto the knife 36 and flange 41 finally into the trough 42 by means of which it flows into the whey reservoir. To facilitate the initial drainage of the residual free whey from the vessel 10, four removable corner screens can be placed in the vessel 10 in contact with the porous bottom 43 prior to filling with the curds from the drum 14. The drainage is rapid so that the screens can be soon removed after filling and before the platen 11 is lowered. Of course, it is apparent that the corner screens may be built into the vessel 10 with appropriate modification of the platen 11.

Figure 3:
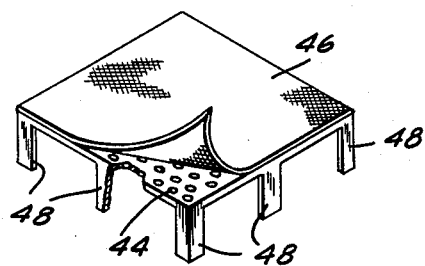
FIGURE 3 is a view in perspective of the removable bottom for the compression chamber.
Figure 4:
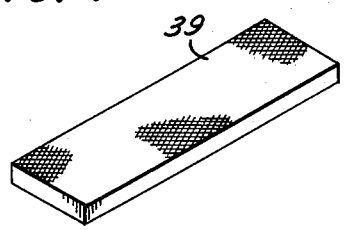
FIGURE 4 is a view in perspective of a slab of pressed curd delivered by the compression chamber illustrated in FIGURES 1 and 2.

Referring now particularly to FIGURE 2 a removable porous bottom 43 is positioned in the compression chamber during fusion of the curd mass. The porous bottom 43, consisting of a metallic screen 44 supported by members 48 and covered by cheesecloth 46, facilitates the removal of free whey. This bottom 43 is readily removed after fusion is completed by first moving the parting knife and partion 29 horizontal immediately above and completely across the porous bottom 43 so as to support the fused mass and then actuating the extrusion piston 32 to eject the temporary bottom 43 from the press. Return first of the extrusion piston 32 and then the parting knife and partition 29 allows the fused curd mass to move downward so as to be in proper position for cutting the slabs of curd. The removable porous bottom 43 and cheesecloth covering 46 is shown in FIGURE 3. The cheesecloth 46 merely retains the small curds within the vessel 10, which curds would otherwise pass through the screen holes. The fused curd 39 is shown in FIGURE 4.

Referring now particularly to the preferred curd treating apparatus shown in FIGURE 5, the slab conveyor 40 terminates over a shredder or milling machine, shown schematically at 50, and a screw conveyor 52 is shown for conveying the shredded or milled curd under a warm water spray 54 and then to a salt brine spray 56.

The warm water from water spray 54 washes the surface traces of free whey and butterfat from the shredded curd. The wash water drains from the screw conveyor 52 at drain pipe 58 and the butterfat is thereafter recovered from the drainage. The salt spray readily produces a salt content of from 1 to 2% in the washed, shredded curd. The salted curd is conveyed onto the hooping operation by falling through outlet 61 into container 63. The brine drains from the screw conveyor 52 through outlet 59 into brine tank 60 where it undergoes clarification by circulation through filter screen 62. The saturated salt solution of brine (26% by weight) is pumped by pump 64 into the system for subsequent spraying of the curd. The brine level in the tank 60 is maintained by controlled addition of brine from supply tank 66 through the float valve 68. The brine drain from the sprayed curd is isolated from the water wash by baffle plate 70. This apparatus provides the obvious advantages that the whey and butterfat are recovered in usable form without salt contamination and that the salt brine can be readily recirculated with consequent saving of salt.

An alternate curd treating apparatus is shown in FIGURE 6. The shredded or milled curd is deposited at the end of the screw conveyor 52a after which it is washed with warm water from spray 54a as above. The washed and shredded curd is thereafter conveyed under a salt container 72. This container 72 is provided with stationary 74 and movable 76 bottoms both having perforations which do not communicate when the container 72 is at rest. Movement of the movable bottom 76 by rotation of wheel 78 facilitates interrupted passage of the salt from the reservoir 72 onto the washed curd passing below. The finely divided salt is thus sprinkled onto the curd achieving salting. For reasons not fully understood this dry salting achieves uniform salting with almost quantitative incorporation of the salt. This procedure has the advantage of avoiding the brine spray.

In operation, a suspension of curd and whey having a total acid content (a term used herein to refer to the total titratable acidity of the whey, expressed as percentage of lactic acid) of between about 0.13 and 0.17% is introduced into the rotary porous drum from a conventional cheese vat or the like. The method of obtaining an acidity within the 0.13 to 0.17% range specified is conventional and well known to those skilled in the art, it being normal practice to condition the amount of starter and rennet utilized to the quality, and particularly the fat content, of the milk and also to adjust the coagulation and cooking time and temperature correspondingly. Conventional methods of cooking may, however, advantageously be modified in accordance with the invention to the extent of cooking at slightly lower temperatures and thus achieving better texture than is obtainable at the slightly higher temperatures. It is essential to drain off as much of the free whey as possible, at least about 90%, in a rotating porous drum 14 before introducing the suspension into the compression chamber 10.

As is well known by persons skilled in the making of hard cheeses, the moisture content of the finished cheese is primarily controlled by the manner in which the curd is cooked and stirred in the cheese vat. The moisture content in turn determines, certainly in part, the amount of the free whey. The present invention has in part come about through the discovery that susbtantially all of the free whey should be removed prior to the fusion of the curd. The free whey is considered to be that milk serum which is removed from the cheese curd during the full preparative process or in other words, the difference in weight between the total weight of the milk processed and the weight of the cheese obtained. This is accomplished by removal of most of the free whey (that is about 90% and preferably at least 95% by weight) from the curds prior to their entry into the compression chamber and removal of substantially the remainder of the free whey from the chamber during the curd fusion. For reasons not fully understood such removal provides excellent texture of the finished cheese and for a standardized product of exceptional quality.

When the drained contents of a cheese vat have been passed through the drum 14 and emptied into the vessel 10, the corner screens, if used, are thereafter manually removed and the platen 11 is moved downwardly, by actuation of cylinders 12, to drain off any free whey at the top of the suspension through the perforations 16. The free whey thereupon passes to the non-perforated portion 17 by way of the filter screen 19, which filters out particles of curd that may have passed through the perforations 16. From the non-perforated portion 17 of the platen 11, the free whey is siphoned out or otherwise removed by means forming no part of the invention.

The remainder of the free whey with the curds in the vessel 10 is removed from the bottom of the curd mass by filtration through the cheesecloth and porous plate onto plate 20 to drain off over the knife 36 and flange 41 into the trough 42.

The drained curds from which a hard cheese is to be made, that are introduced into the vessel 10 from the porous drum or other means which would provide drainage of most of the free whey from the curds, are thus subjected to external pressure. This pressure removes almost immediately substantially all of the free whey. Continuing the pressure provides fusion of the curds. The pressure should be sufficient to and retained long enough to achieve curd fusion. The fusion is facilitated by the acid development within the curd mass. Suitable pressure range from about 1.45 p.s.i.g. (pounds per square inch, gauge) to about 2.40 p.s.i.g. with a preferred range of from about 1.80 p.s.i.g. to 2.10 p.s.i.g. for a curd set with lactic acid starter and rennet in amounts normally associated with conventional cheddar cheesemaking. The curd mass, having a temperature favorable to acid development (95 to 105° F.) is normally retained under pressure for periods of from 90 to 120 minutes. For a modified starter, that is where a second starter is also used and is of the type whose acid producing activity is not stopped by salting, sufficient fusion of the curd can be achived in much shorter periods, e.g., fifteen to thirty minutes.

The following is an example of curd fusion according to this invention. A suspension of curds and whey was pumped into a revolving foraminous drum where about 95% of the free whey was drained from the curds. The free whey had an acid content of about 0.14% although it can vary from about 0.13 to about 0.17%. The drained curds, having a temperature of about 100° F., were dumped into the compression chamber. A pressure of 1.80 pounds/in.$^2$ was imposed on the curds and about 5% free whey drained from the pressed curd mass. This pressure was retained on the mass for 120 minutes during which acid developed to a value of about 0.55% and the moisture content was between 35 and 40%. The acidity of the fused curds should be between 0.5 to .85% and preferably between 0.55 to 0.60%.

When the curd fusion operation has been completed and the desired acid value and moisture content have been achieved, the fused curd in the chamber was of a sufficiently coherent state to form a block having a texture similar to those exhibited by blocks of curd that are obtained at the end of a conventional cheddaring operation although of superior uniformity. With the platen 11 returned to its higher position, the hydraulic cylinder 31 is actuated to advance the parting knife and partition 29 across the upper surface of the porous temporary bottom 43 of the compression chamber. Cylinder 34 is actuated to cause extrusion piston 32 to eject the temporary porous bottom 43 for its removal from the compression chamber. Withdrawal of knife and partition 29 allows the fused curd mass to drop onto the bottom 20 of the vessel 10. The knife 29 is moved again across the vessel cutting through the fused curd mass. The vertical knife 36 is elevated to its upper retracted position and the plunger 32 is advanced several inches moving the cut bottom portion of the fused curd mass outward. The vertical knife 36 is thereupon raised by the action of hydraulic cylinders 37 to cut a block of fused curd in the bottom of the vessel 10 into a slab 39 which is deposited, as shown in FIGURE 1, by sliding across flange 41 upon the conveyor 40. The knife 36 is retracted to its lowermost position and the operation is repeated, the plunger 32 and the knife 36 being operated alternately until the plunger 32 reaches the right side of the vessel 10 as illustrated in FIGURE 1. The plunger 32 is then retracted to its leftmost position, and the parting knife and partition 29 are likewise retracted so as to allow the remainder of the curd block in the vessel 10 to move down into contact with the bottom member 20. The sequence of operations is then repeated beginning with the movement of the parting knife and partition 29 and proceeding with the alternate movements of the plunger 32 and the vertical knife 36 until the entire curd block in the press has been extruded, cut and deposited upon the conveyor 40. The blocks 39 of curd deposited on the conveyor 40 may be any desired size as will be well understood by those skilled in the art.

In the operation described by way of example with reference to FIGURE 5, the blocks were cut to have dimensions, when lying flat on the conveyor 40, of 24" x 6" x 2". Upon being deposited on the conveyor 40, the blocks were fed continuously into a shredder or milling machine 50 and the shredded curd particles were deposited on a screw conveyor 52. The shredded curd particles were thereupon washed with water while on the conveyor 52. Under normal conditions and in the particular operation described, the temperature of the water spray 54 was approximately 100° F. This washing removes the surface traces of free whey and "butterfat." The wash water drains to the base of the screw conveyor through outlet 58 where it can then be piped to apparatus for recovery off the butterfat. It is to be understood, therefore, that while the step of rinsing with water is not critical or necessary to the method, it is preferred for uniformity of color of the final cheese and retention of proper taste to remove the butterfat and traces of whey from the surface of the shredded curd particles. This provides for uniform absorption of salt in the next step. It also provides for recovery of the butterfat in a salt free manner and provides for a superior flavor of the cheese. Development of the detrimental "butter-milk" taste in cheese which has been quite common with previous hard cheese does not occur when the curds are so washed.

The screw conveyor carries the water washed curds under salt sprays where uniform salting of the curd results. The salt sprays are of a saturated salt solution (about 26% by weight), preferably maintained at 90 to 110° F., which provides a salt content of the cheese of from 1 to 2%. The drainage from the salt spray is removed from the screw conveyor through outlet 59 which is connected with brine tank 60. A stainless steel screen 62 is provided in tank 60 to filter out the brine solution. A brine supply tank 66 furnishes additional brine to the supply tank as it is needed. Even when the water wash is not used, the use of a warm (100° F.) salt brine spray results in cheese which does not develop the "butter-milk" taste.

Generally, the brine solution should be a saturated solution. Its temperature should be of the order of 90 to 110° F., 90° F. being about the minimum for a practical rate of penetration of the salt into the interior of the curd. The residence time for the curd particles under the salt spray should be of the order of about one minute when the temperature is between about 95 and 105° F. and a saturated salt solution is used. The screw conveyor 52 continuously removes the salted curd from under the salt sprays to the hooping and curing operations well known to the art.

In another embodiment of the invention, the shredded curds are, as illustrated in FIGURE 6, moved by means of a screw conveyor 52a first under a warm water spray and then under a vibrated hopper or container 72 from which dry salt is spread over the curds. The salt, which is of a finely granulated form, is substantially quantitatively absorbed into the curds. Addition of the salt at a rate of about 2% by weight of the curd passing along the conveyor per unit will achieve a salting of about 1.5 to 2.0%. The advantage of this approach to the salting is the apparently uniform salting of the curd while avoiding the auxiliary apparatus necessary for the brine spray. The salt addition must be governed by the passage of the curd, which can be done easily by relating the salt addition to the screw conveyor movement. Salting of the cheese curd by either the brine spray or the dry salt technique disclosed herein shortens the time previously required for salting by 45 minutes to one hour.

One of the most outstanding advantages of the method and apparatus of the invention is that it is now possible to impose a substantially constant pressure on the curd fusion press and in turn be assured of a remarkably uniform and improved end product. The method and apparatus has provided an automation of cheese production previously thought impossible. No longer is the sought for uniformity of cheese dependent entirely on the visual perception and experience of the operator as in the normal cheddaring operation the turning and piling of the blocks.

Other important advantages of this phase of the method of the invention as well as of the succeeding steps of shredding, rinsing and salting, are the inherently greater opportunities for providing sanitary facilities in the production of cheese and for the use of labor saving mechanization.

A further advantage of the washing and salting method and apparatus illustrated in FIGURES 5 and 6 resides in the ease of control over the final salt content of the curd, and therefore, in the aging properties of the cheese produced. A still further advantage is a greater yield of cheese (3 to 4%) for a given volume of milk than is obtained with conventional procedures.

The apparatus and method of the invention have the further advantage that they lend themselves not only to the making of Cheddar cheeses, wash curd cheese and Colby cheese, but also to the semi-soft and soft cheeses, such as Limburger, Munster, Camembert, Brie and cottage. For the stirred curd cheese the compression chamber may be avoided as there is little need of curd fusion, however, most of the free whey should be drained rapidly from the curds as by the rotating drum and the washing and salting carried out in accordance with the preceding discussion. For the other cheeses fusion of the drained curd will be carried out in the compression chamber although with pressures appropriate for the particular cheese curd. With all of these cheeses a superior product will be obtained when most (90%) but preferably substantially all (98%) of the free whey is rapidly removed from the curd when the whey has developed an acid content appropriate for the particular type of cheese and at which fusion of the curd readily occurs.

The finished cheese prepared in accordance with the method of the invention is characterized by uniformly excellent flavor, a superior firm and waxy texture, an improved translucent appearance and excellent shelf properties. This is believed to be due in part to the fact that it is unnecessary to cook the curd at a temperature higher than about 100° F.; higher cooking temperatures, which impair final texture, being frequently employed in conventional operations to counteract the extensive loss of heat from the blocks of curd that are turned and piled in the vat. Another reason for the increased uniformity of good texture and flavor is that substantially all of the free whey has been removed early in the acid development so that curd fusion can readily be obtained as a result of an easily controlled mechanically applied external force. Another important advantage is derived from the water rinsing of the shredded curd particles to remove surface traces of whey and butterfat, so that uniformity of salting and improved flavor are achieved.

This is in sharp contrast to the hit-or-miss salting operations heretofore carried out by hand on shredded curd particles in the bottom of a cheese vat. It is also of significant importance that cheese prepared by the method and apparatus of the invention has the unique property of curing much more rapidly than heretofore considered possible.

It is to be understood that many variations and modifications will readily occur to those skilled in the art upon reading this description. All such variations and modifications are intended to be included within the scope of the invention as defined in the appended claims.

I claim:

1. Method for making cheese which comprises tumbling a mixture of curds and whey to drain most of the free whey therefrom, forming a fused curd mass by applying a constant external pressure in a range of 1.80 to 2.10 p.s.i.g. upon a curd mass while retained in confined space to subject the entire mass to said pressure, said free whey having an acid content between about 0.13 and about 0.17%, maintaining said curd mass under said pressure at a temperature in the range of 95° F. to 105° F. favorable to acid development to further increase the acidity of the mass in its relatively dry state, draining from said curd mass substantially all of the free whey immediately upon separation therefrom, maintaining said pressure until said curd mass is fused, shredding the pressed curd mass and salting the shredded cheese curd.

2. The method of claim 1 in which said drained curd mass has less than about 10 percent by weight of the free whey.

3. The method according to claim 1 wherein said salting is by spraying said shredded curd with a warm saturated brine solution.

4. The method according to claim 1 wherein said external pressure is maintained on said curd mass until said curd mass develops an acidity of from 0.50% to 0.85% and has a moisture content of between 35 and 40%.

5. The method according to claim 1 including the further step of washing said shredded curd mass with warm water to remove surface traces of free whey and butterfat, said washing prior to said salting.

6. The method according to claim 5 wherein the salting is by sprinkling said washed curds with dry salt.

7. The method for making cheese which comprises tumbling a mixture of curds and whey to drain most of the free whey therefrom from a suspension of curds and whey, pressing a substantial mass of the drained curd in a confined space by application of external pressure, said curd having a temperature favorable for acid development in the range of 95° F. to 105° F., said drained free whey having an acidity between about 0.13% and 0.17%, draining from said curd mass substantially all of the free whey immediately upon separation from the curd mass, maintaining said pressure on said curd mass until the curd is fused and the acidity of the mass in its relatively dry state has increased, shredding said curd mass, spraying said shredded curd mass with a warm salt brine for salting of said curd mass.

8. Method according to claim 7 including the further step of washing said shredded curds with water having a temperature of from 95 to 105° F. to remove surface traces of free whey and butterfat.

9. Method according to claim 8 including the further steps of collecting said brine, filtering said brine and re-cycling said brine for further use as an agent for salting shredded curds.

10. Method for making cheese which comprises tumbling a mixture of curds and whey to drain at least 90 percent of the free whey therefrom, said free whey having an acidity content between about 0.13 to about 0.17%, pressing the drained curd in a confined space by application of external pressure of from about 1.80 p.s.i.g. to about 2.10 p.s.i.g. on said curd mass and maintaining said pressure from about ninety minutes to about 120 minutes to obtain curd fusion, draining substantially all the free whey from said curd mass as a result of said external pressure, said curd having a temperature suitable for acid development in the range of 95° F. to 105° F. to increase the acidity of the relatively dry mass substantially above 0.17%, shredding said curd fused mass, washing said shredded curds with water having a temperature within the range of from 95 to 105° F. to remove surface traces of free whey and butterfat, and salting said shredded curd by spraying with a salt brine to provide a salt concentration of from about 1 to 2% by weight of the cheese.

11. The method for making cheese which comprises tumbling a mixture of curds and whey to drain at least 90% of the free whey therefrom when said free whey has an acid content appropriate for fusion of the curds, shredding said drained curds and washing said shredded curds with a warm salt spray.

References Cited in the file of this patent

UNITED STATES PATENTS

| 30,638 | McAllister | Nov. 13, 1860 |
| 2,141,698 | Saunders | Dec. 27, 1938 |
| 2,494,638 | Stine | Jan. 17, 1950 |
| 2,768,083 | Hensgen | Oct. 23, 1956 |

OTHER REFERENCES

U.S.D.A. Bulletin 608, revised February 1932, "Varieties of Cheese," pp. 10–11.

Food, April 1936, pp. 277–280.

U.S. Dept. of Agriculture Circular No. 279, July 1933, pp. 4–5, 10–15.

UNITED STATES PATENT OFFICE
CERTIFICATE OF CORRECTION

Patent No. 3,078,170                  February 19, 1963

Henry Leber

It is hereby certified that error appears in the above numbered patent requiring correction and that the said Letters Patent should read as corrected below.

Column 8, lines 11 and 12, strike out "from a suspension of curds and whey".

Signed and sealed this 8th day of October 1963.

(SEAL)
Attest:

ERNEST W. SWIDER
Attesting Officer

EDWIN L. REYNOLDS
Acting Commissioner of Patents